US012516546B1

(12) United States Patent
An et al.

(10) Patent No.: US 12,516,546 B1
(45) Date of Patent: Jan. 6, 2026

(54) RATCHING LATCH WITH QUICK RELEASE MECHANISM

(71) Applicant: AMD Design, LLC, Wilmington, DE (US)

(72) Inventors: Chen An, Secaucus, NJ (US); Mahesh Kumar Varrey, Secaucus, NJ (US)

(73) Assignee: AMD Design, LLC, Wilmington, DE (US)

( * ) Notice: Subject to any disclaimer, the term of this patent is extended or adjusted under 35 U.S.C. 154(b) by 156 days.

(21) Appl. No.: 17/987,161

(22) Filed: Nov. 15, 2022

(51) Int. Cl.
*E05B 57/00* (2006.01)
*E05B 15/00* (2006.01)
*E05C 3/16* (2006.01)

(52) U.S. Cl.
CPC .......... *E05B 57/00* (2013.01); *E05B 15/0046* (2013.01); *E05C 3/162* (2013.01)

(58) Field of Classification Search
CPC ...... E05B 57/00; E05B 15/0046; E05B 17/20; E05B 17/2049; E05B 17/2003; E05B 17/2007; E05B 17/2011; E05B 17/2015; E05B 17/2019; E05B 17/2023; E05B 17/2026; E05B 17/2034; E05B 17/2038; E05B 17/2042; E05C 3/162; E05C 3/3616; E05C 3/24; E05C 3/22; E05C 3/26; E05C 3/30; E05C 3/36; E05C 3/16
USPC .................................................. 361/801, 803
See application file for complete search history.

(56) References Cited

U.S. PATENT DOCUMENTS 372,961 A * 11/1887 Budd et al. ............. E05B 57/00 70/452
2,146,379 A * 2/1939 Rediger .................... E05C 3/24 292/207
2,246,793 A * 6/1941 Dall ........................ E05B 83/16 292/99
2,507,196 A * 5/1950 Dall ........................ E05B 83/16 292/108
2,806,727 A * 9/1957 Johnstone ............... E05B 83/16 292/216
3,029,096 A * 4/1962 Welch ................. E05B 65/1006 292/336
3,421,785 A * 1/1969 Slattery ................. E05B 85/243 292/216

(Continued)

FOREIGN PATENT DOCUMENTS

DE 102005002296 B3 * 9/2006 ........... E05B 15/004
DE 202011108846 U1 * 5/2013 ......... E05B 15/0046

(Continued)

*Primary Examiner* — Christine M Mills
*Assistant Examiner* — Faria F Ahmad
(74) *Attorney, Agent, or Firm* — Dergosits & Noah LLP; Todd A. Noah

(57) ABSTRACT

An apparatus is provided for securing a first chassis within a second chassis in a manner than completes a blind connection and maintains that connection without the use of tools. A cam tooth on an arm rotating with respect to the first chassis engages a striker on the second chassis and, with rotation of the arm toward the first chassis, draws the first chassis into the second. The arm is attached to a handle including a cam hook that rotates to engage a striker of the first chassis. With rotation of the cam hook, the striker draws the handle toward the first chassis, the resulting movement of the arm toward the first chassis causing the arm to rotate and the cam tooth to draw the first chassis into the second.

19 Claims, 8 Drawing Sheets

(56) References Cited

U.S. PATENT DOCUMENTS

| | | | | | |
|---|---|---|---|---|---|
| 3,572,793 | A * | 3/1971 | Cole | E05B 83/16 | 292/216 |
| 3,652,113 | A * | 3/1972 | Odend'hal | E05C 3/24 | 292/216 |
| 3,695,659 | A * | 10/1972 | Gionet | E05B 83/16 | 292/216 |
| 3,730,575 | A * | 5/1973 | Arlauskas | E05B 83/16 | 292/216 |
| 4,194,377 | A * | 3/1980 | Maeda | E05B 85/243 | 292/216 |
| 4,573,333 | A * | 3/1986 | Choi | E05B 47/0002 | 292/201 |
| 4,635,454 | A * | 1/1987 | Brown | E05C 3/24 | 292/216 |
| 4,973,091 | A * | 11/1990 | Paulson | E05C 9/042 | 292/216 |
| 6,027,148 | A * | 2/2000 | Shoemaker | E05B 47/0607 | 292/201 |
| 6,113,161 | A * | 9/2000 | Jung | E05B 85/26 | 292/216 |
| 6,155,616 | A * | 12/2000 | Akright | E05B 5/00 | 292/202 |
| 7,270,029 | B1 * | 9/2007 | Papanikolaou | E05B 85/01 | 292/201 |
| 7,959,205 | B2 * | 6/2011 | Paing | B60N 2/01583 | 296/65.03 |
| 2009/0235767 | A1 * | 9/2009 | Garneau | E05B 47/0012 | 292/201 |
| 2010/0259061 | A1 * | 10/2010 | Paing | B60N 2/01583 | 296/65.03 |
| 2011/0267657 | A1 * | 11/2011 | Tsujishita | H04N 1/00546 | 358/296 |
| 2013/0341939 | A1 * | 12/2013 | Glover | E05C 3/16 | 292/341.17 |
| 2015/0115629 | A1 * | 4/2015 | Gartner | E05B 65/0082 | 292/220 |
| 2016/0356057 | A1 * | 12/2016 | Lin | E05B 17/0029 | |
| 2020/0109579 | A1 * | 4/2020 | Ottino | E05B 77/04 | |
| 2024/0278899 | A1 * | 8/2024 | Boas | B64C 1/1407 | |

FOREIGN PATENT DOCUMENTS

| | | | | |
|---|---|---|---|---|
| EP | 3486152 | A1 * | 5/2019 | B62H 3/00 |
| FR | 2753224 | A1 * | 3/1998 | E05B 17/0029 |
| GB | 2324331 | A * | 10/1998 | E05B 63/0004 |

* cited by examiner

RATCHING LATCH WITH QUICK RELEASE MECHANISM

FIELD OF THE INVENTION

The present subject matter relates generally to latches an in particular to latches with a cam action.

BACKGROUND

In certain applications, connecting a board to a backplane is performed blind. Conventional methods to achieve a proper blind mate include using a cam lever that, after being used to leverage the board to mate with the backplane, is secured to the device with a thumbscrew. There may be multiple such thumbscrews, making service difficult. Overly large or multiple thumbscrews occupy valuable space on the face of the device, which may be needed for I/O or for cooling flow. Furthermore, to set a thumbscrew, a user must apply force to the lever at the same time the thumbscrew is being fastened, which is not user friendly. And thumbscrews, in general, do not provide for a quick release.

Other challenges include: such connectors often have high insertion forces of, e.g., 126 N, or greater per connector; de-mate allowances for the blind connectors may be very small; and typical spring-loaded latches may be unfeasible due to tolerance stack issues.

Thus, what is needed is a latch that amplifies the user effort to make a connection, and both secures and releases in a user-friendly manner.

BRIEF DESCRIPTION OF THE DRAWINGS

The embodiments are illustrated by way of example and not limitation in the accompanying drawings, in which like references indicate similar elements, and in which.

DETAILED DESCRIPTION

Figure 1:
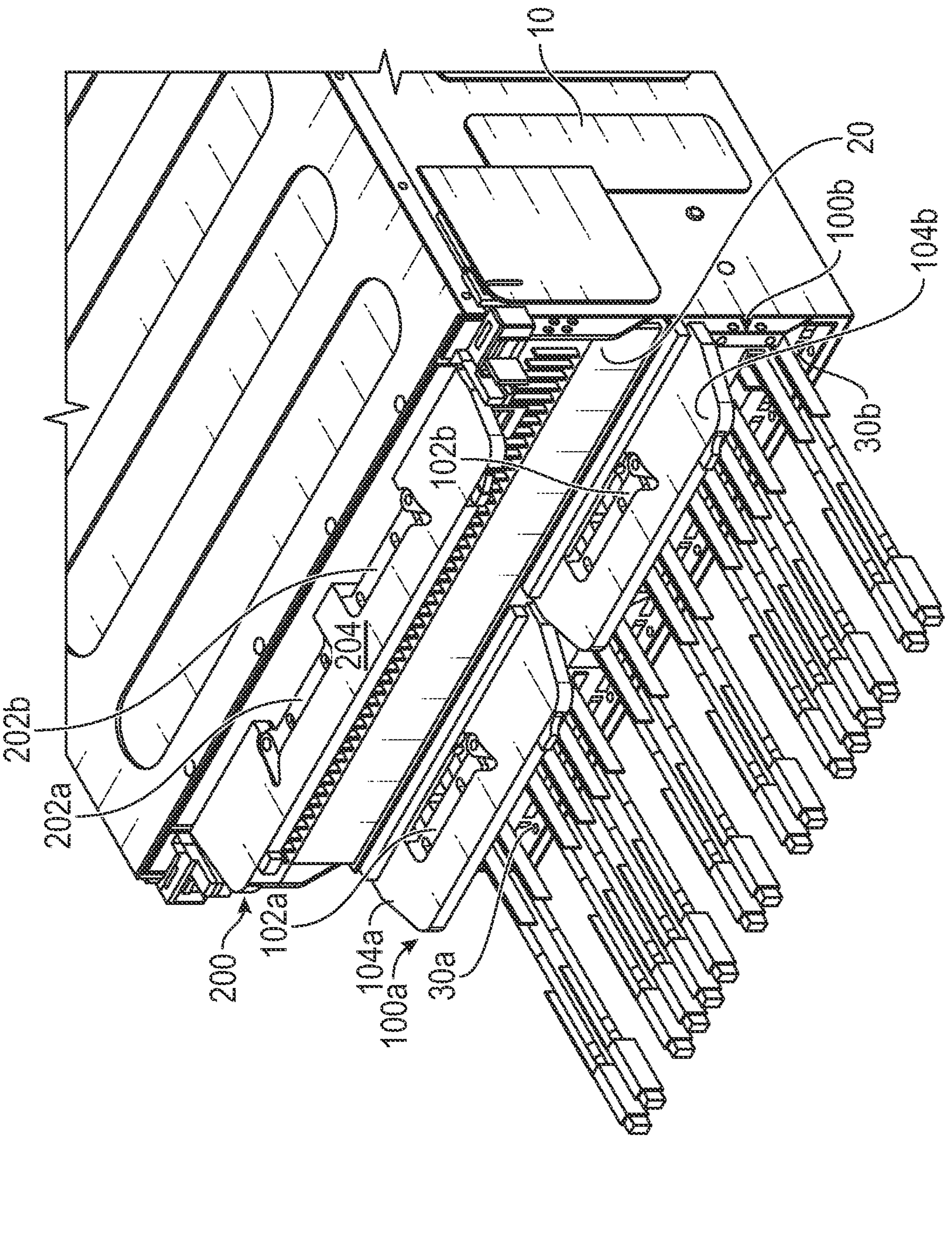
FIG. 1 is an isometric view of embodiments of a ratcheting latch with a quick release mechanism.

Embodiments described within disclose a latch with a cam action that may be used to make and maintain a blind connection. FIG. 1 is an isometric view of embodiments 100, 200 of ratcheting latches with quick release mechanisms. In FIG. 1, an exemplary JBOG ("Just a Bunch of GPUs") chassis 10 is shown to house a GPU board housing 20 and switch board trays 30*a*, 30*b*. Ratcheting latches 100*a*, 100*b* secure trays 30*a*, 30*b* within chassis 10, respectively. Ratcheting latch 200 secures GPU board housing 20 within chassis 10. Ratcheting latch 100*a* extends across half the face of chassis 10 because it is associated with a single switch board tray 30*a*. Latch 200 extends across the entire face of chassis 10, being associated with GPU board housing 20. In this view, latch 100 is shown to include a handle 104 with a lever 102 and ratcheting latch 200 includes a handle 205 and levers 202*a*, 202*b*.

In this discussion, reference numbers ending with letters indicate a different instantiation of the same item. For example, ratcheting latch 100*a* and ratcheting latch 100*b* are identical. Thus, discussion of the properties and functions directed to a specific instantiation, e.g., 100*a* or 100*b*, also applies to the general element, e.g., 100, and vice versa.

Figure 2:
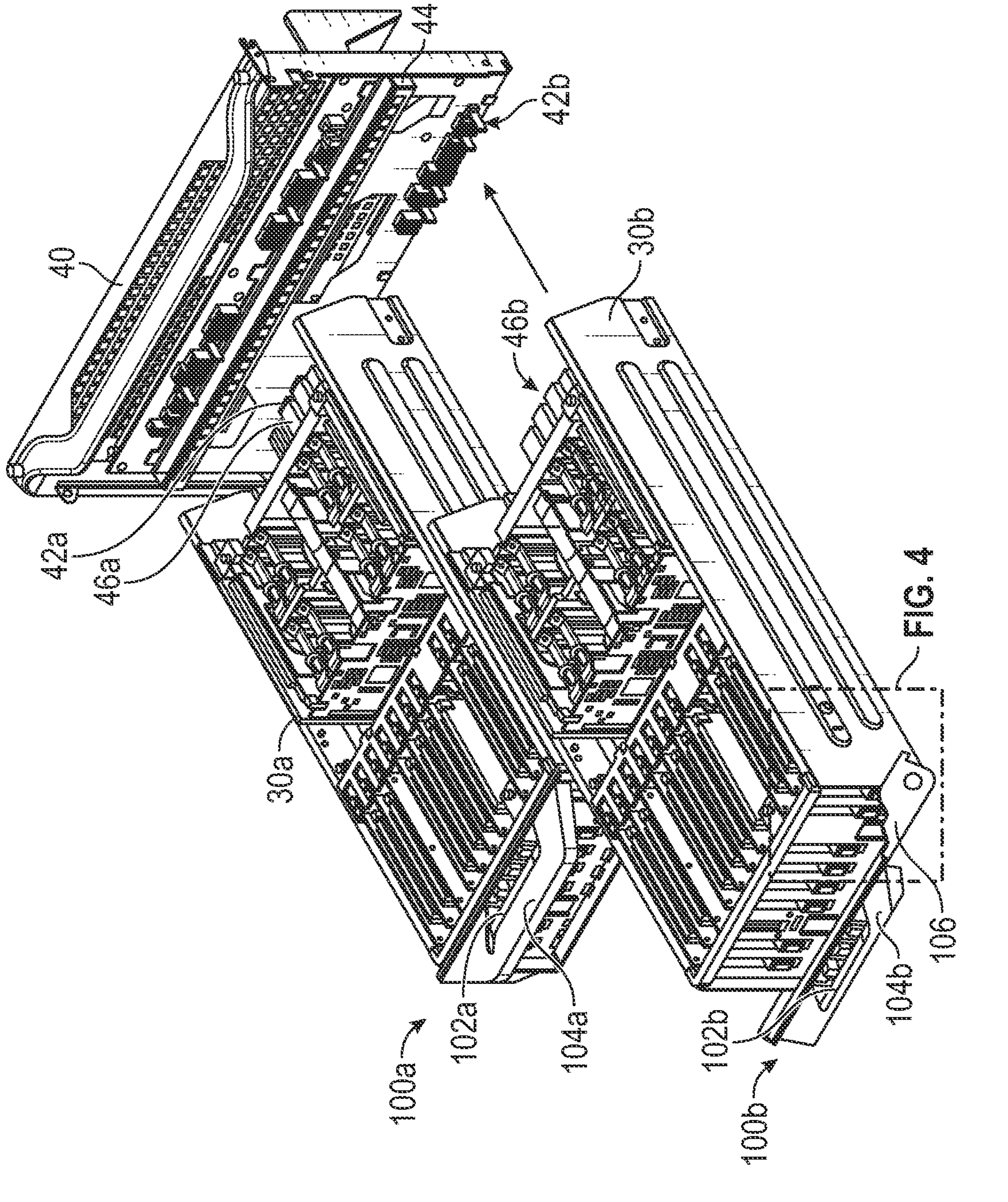
FIG. 2 is an isometric view of embodiments of a ratcheting latch with a quick release mechanism.
Figure 3:
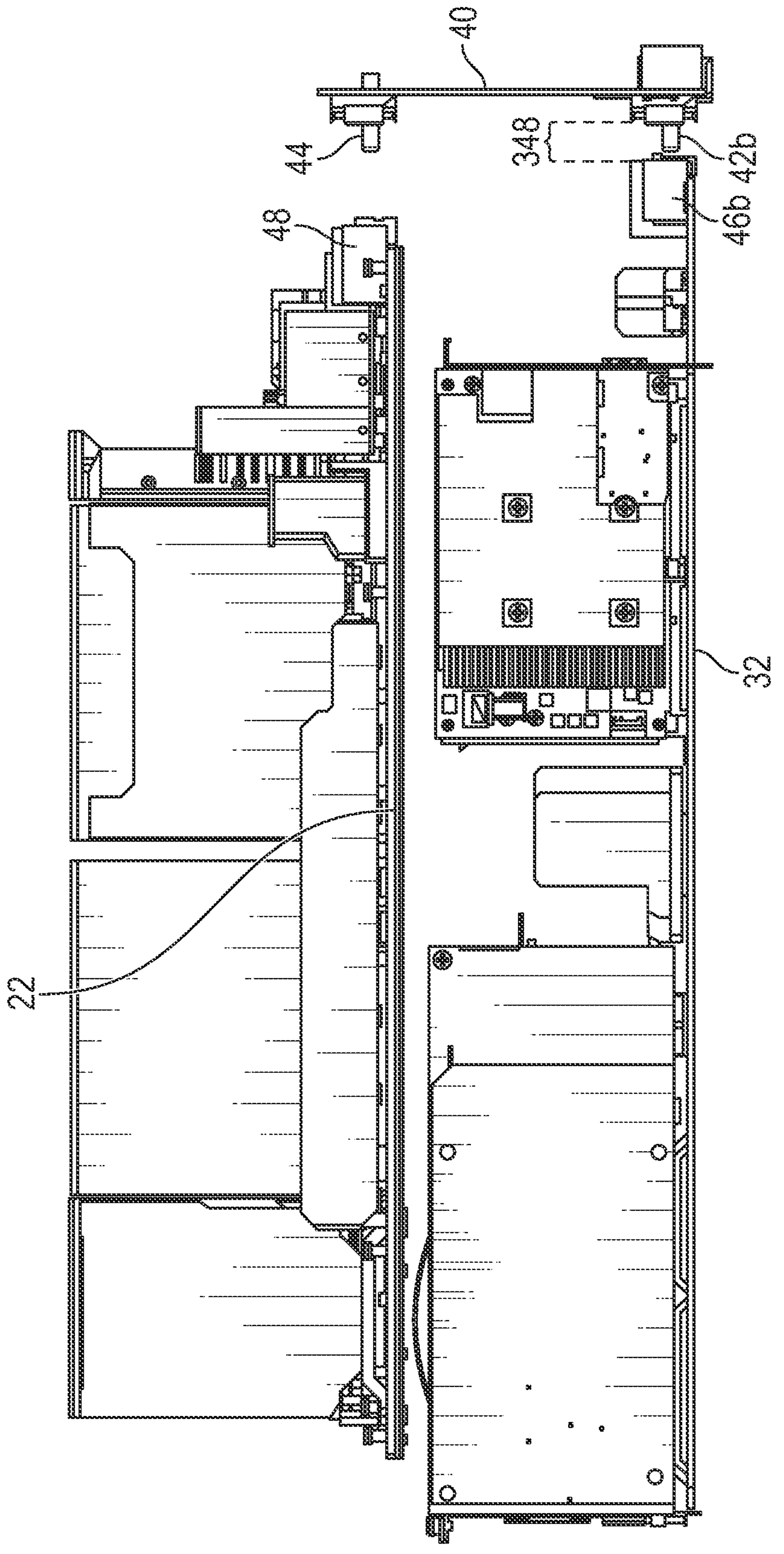
FIG. 3 is a cross-section of a side view of aspects of embodiments of a ratcheting latch with a quick release mechanism.

FIG. 2 is an isometric view of an embodiment of ratcheting latch 100 with a quick release mechanism with the external housing of chassis 10 removed, leaving a common backplane 40. In FIG. 2, connectors 46*a* of switch board tray 30*a* are shown mated with connectors 42*a* of common backplane 40. The closed position of handle 104*a* of latch 100*a* indicates that switch board tray 30*a* is latched in place. Switch board tray 30*b* is positioned to be slid toward common backplane 40. Connectors 44 of common backplane 40 are positioned to connect to a GPU board 22 (FIG. 3). Ratcheting latch 30*b* is shown with handle 104*b* in the unlatched position, indicating that tray 30*b* may be inserted or removed from chassis 10. FIG. 2 illustrates the "blind" nature of connections between connectors 42 and 46. The same "blind" nature holds for connectors 44 and 48 (FIG. 3).

FIG. 3 is a right-side cross-section of a side view of aspects of embodiments of a ratcheting latch with a quick release mechanism without chassis 10, housing 20, or trays 30. In FIG. 3, GPU board 22 within GPU board housing 20 is shown to include connectors 48, which are configured to mate with connectors 44 of backplane 40. Similarly, a switch board 32 within switch board tray 30 includes connectors 46, which are configured to mate with connectors 42. FIG. 3 illustrates a gap 348 between connectors 42 and 46 that is closed by the use of ratcheting latch 100. A similar gap exists between connectors 44 and 48 and is closed by the use of latch 200.

Figure 4:
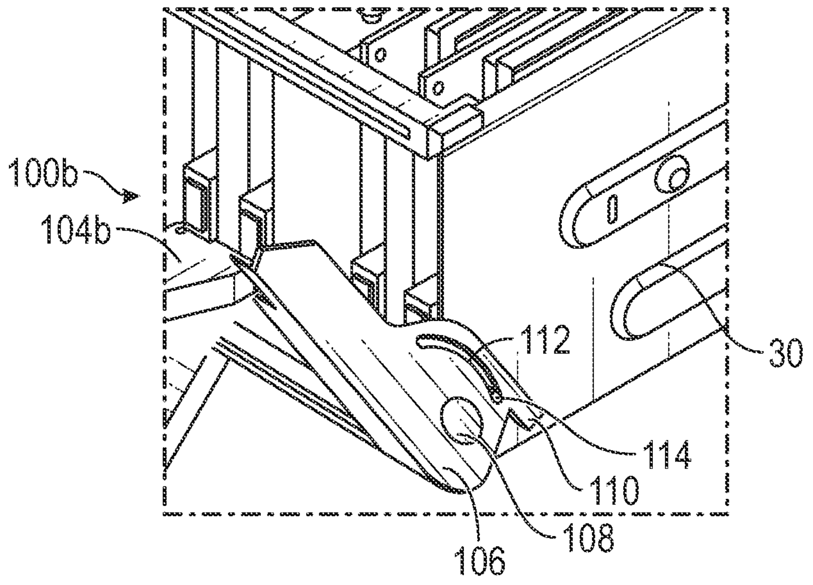
FIG. 4 is an isometric view of an enlarged section of FIG. 2 in a first state.

FIG. 4 is an isometric view of an enlarged section of FIG. 2 in an unlatched state. In FIG. 4, ratcheting latch 100*b* is shown to include an arm 106 connected to handle 104*b* and to tray 30 at a pivot 108. Arm 106 includes a cam tooth 110 that in this raised, unlatched position, does not engage a striker (not shown) associated with an inside face of chassis 10. Thus, tray 30*b* may be moved with respect to chassis 10. Arm 106 further includes a track 112 within which a track follower 114 (attached to tray 30) travels, thereby limiting the range of rotation of arm 106 about pivot 108. FIG. 4 illustrates one side of handle 104*b* and a mirror image of arm 106 is attached to the other side of handle 104*b* and functions in the same manner described with reference to FIG. 4.

Figure 5:
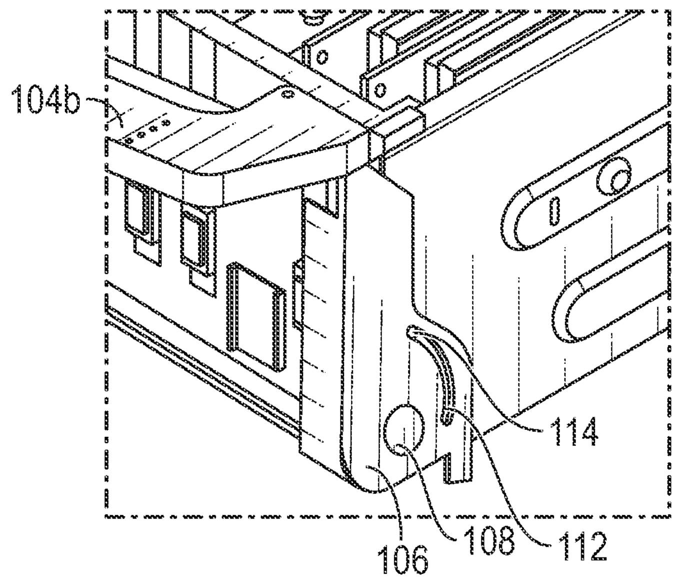
FIG. 5 is an isometric view of the enlarged section of FIG. 2 in a second state.

FIG. 5 is an isometric view of the enlarged section of FIG. 2 in a latched state. In FIG. 5, arm 106 has been rotated to fully abut tray 30, indicating that ratcheting latch 100 is latched. With cam tooth 110 that in this lowered, latched position, tooth 110 engages the striker (not shown) of chassis 10, which prevents tray 30 from being withdrawn from chassis 10. As will be discussed with reference to cam hook 120, as cam tooth 110 is rotated downward by arm 106, tooth 110 engages a striker of chassis 10. With further downward rotation, the cam of cam tooth 110 (like that of cam hook 120) acting against the chassis striker, draws tray 30 further into chassis 10, seating connectors 42 and 46. With handle 104 held in this position by cam hook 120, tooth 110 remains engaged with the striker of chassis 10. In this latched position, the connections between connectors 42 and 46 are maintained securely. In embodiments, there are two cam teeth 110 for each handle (one cam tooth on each side of the handle), thus the mating force supplied by one cam tooth 110 is doubled.

Figure 6:
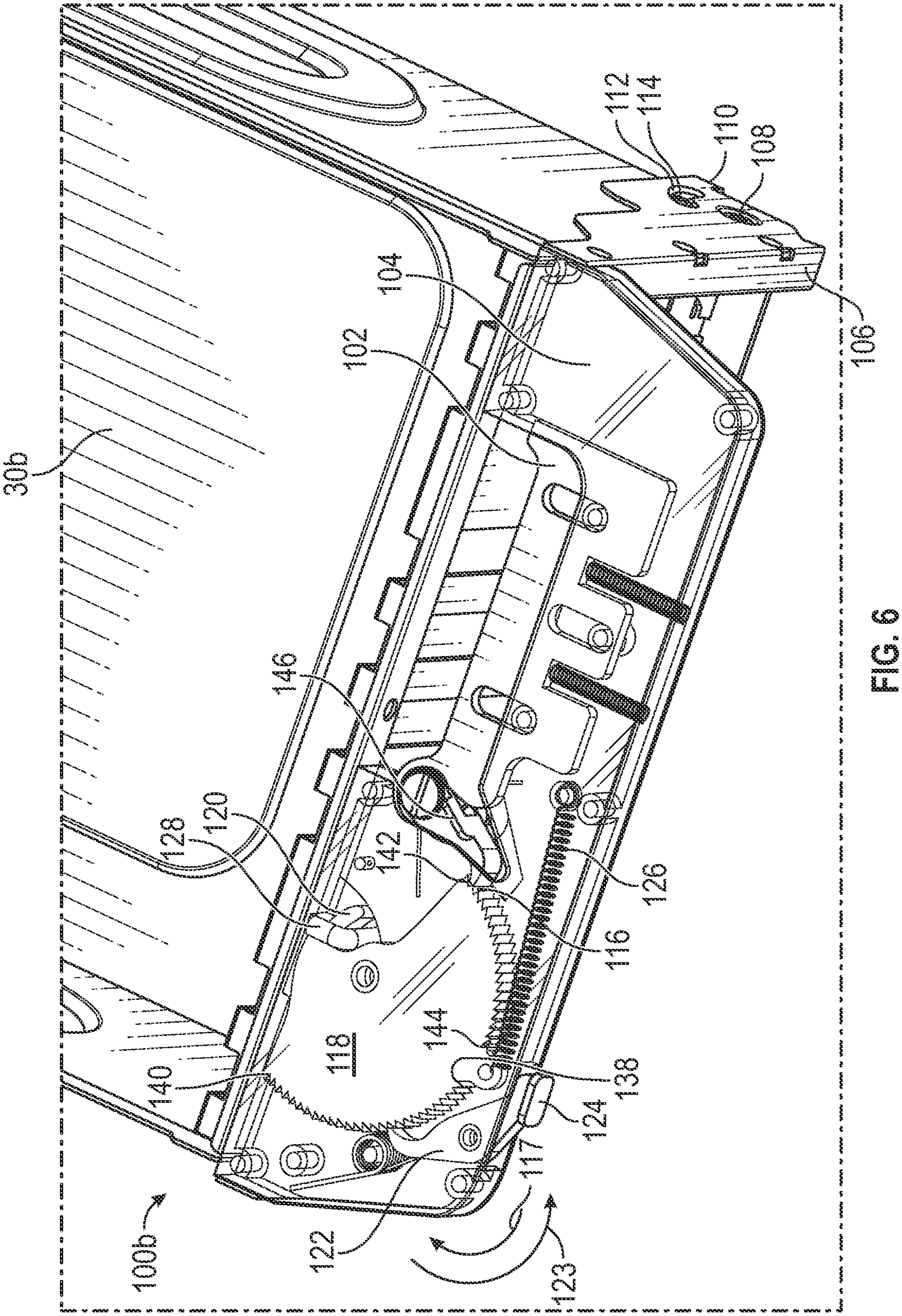
FIG. 6 is a partially-transparent isometric view of an embodiment of a ratcheting latch with a quick release mechanism.

FIG. 6 is a partially-transparent isometric view of an embodiment of ratcheting latch 100 with a quick release mechanism. In FIG. 6, lever 102 is squeezed by a user, which pushes switch tray 30 further into chassis 10, seats connectors 42, 46, and locks latch 100 in place against the face of switch tray 30. A driving pawl 116 is biased by a spring (not shown) against a ratcheting gear 118. When squeezed by the user into handle 104, lever 102 drives pawl 116 against ratcheting gear 118. Pawl 116 engages a tooth between teeth 142 and 144 of gear 118 and rotates gear 118 in direction 117. Rotation in direction 117 causes cam hook 120 to engage a striker 128 on the face of switch tray 30. With further squeezing, and the resulting rotation of gear 118, the cam section of cam hook 120 draws striker 128 into handle 104, snugging handle 104 against the face of switch tray 30.

After switch tray 30 has been inserted sufficiently into chassis 10, movement of handle 104 toward and against tray 30 causes cam tooth 110 to engage a striker (not shown) of chassis 10. As cam tooth 110 is rotated downward by arm 106, tooth 110 engages the striker. With further downward rotation, the cam of cam tooth 110 (like that of cam hook 120), draws tray 30 further into chassis 10, seating connectors 42 and 46. The final rotation of arm 106 is caused by cam hook 120 engaging striker 128 and drawing handle 104 toward tray 30. Hook 120 being held in its final position (FIG. 6 and FIG. 7C) ensures that arm 106 and tooth 110 do not move with respect to the chassis striker. Thus, when tray 30 is within chassis 10 and in the configuration shown in FIG. 6, tray 30 is retained within chassis 10 until pawls 116, 122 are released.

A stepping pawl 122 is biased toward gear 118 by a spring 130 (FIG. 7B) such that pawl 122 engages a tooth between teeth 138 and 140. As gear 118 is rotated in direction 117, pawl 122 rides along the teeth toward tooth 138. Teeth 138-140 and 142-144 are slanted so that they cooperate with pawls 116, 122 to resist rotation of gear 118 in direction 123. Thus, as gear 118 rotates in direction 117, pawl 122 works with teeth 138-140 to hinder rotation of gear 118 in direction 123. As a result, with cam hook 120 fully engaging striker 128, stepping pawl 122 maintains that latched position by preventing gear 118 from rotating in direction 123.

To unlatch ratcheting latch 100, stepping pawl 122 is disengaged from teeth 138-140 by the user pressing a release button 124. Simultaneously, the user presses a tab 146 on pawl 116 to cause pawl 116 to disengage from teeth 142-144. With both pawls 116 and 122 disengaged, a reset spring 126 is sized to exert a force sufficient to cause cam hook 120 to disengage from striker 128 and rotate in direction 123.

With cam hook 120 disengaged, handle 104 may be rotated forward by the user to disengage cam teeth 110 from the associated striker on chassis 10. With cam teeth 110 disengaged, switch tray 30 may be withdrawn from chassis 10.

Thus, embodiments use the squeezing force supplied by the user to lever 102 and leverages that force by the cam action of cam hook 120 and the associated cam action of cam tooth 110 to ensure an appropriate force is used to fully seat connectors 42 and 46. This satisfies the requirements in some data centers that connectors be seated without the use of tools. Furthermore, embodiments reduce user effort by employing cam hook 120 in combination with cam tooth 110 and are thus user friendly-only a single hand is required to both seat connectors 42 and 46 and latch handle 104 against switch tray 30. This is preferable to using thumbscrews. Even more, the quick release provided by release button 124 and tab 146 makes removal as user-friendly as installation. And in instances where space on the face of the device is at a premium, such as when the face is a passage for I/O or cooling airflow, the thin frontal profile of handle 104 does not obstruct the face.

This discussion has largely referred to ratcheting latch 100. Ratcheting latch 200 is similar to latch 100 in the elements associate with each lever 202*a*, 202*b*. Ratcheting latch 200 is essentially two latches 100 joined together to span the complete face of GPU board housing 20, but with each lever 202*a*, 202*b* controlling only a single side arm and tooth. Thus, the discussion of latch 100 regarding the components of handle 104 applies equally to latch 200 and handle 204.

Figure 7A:
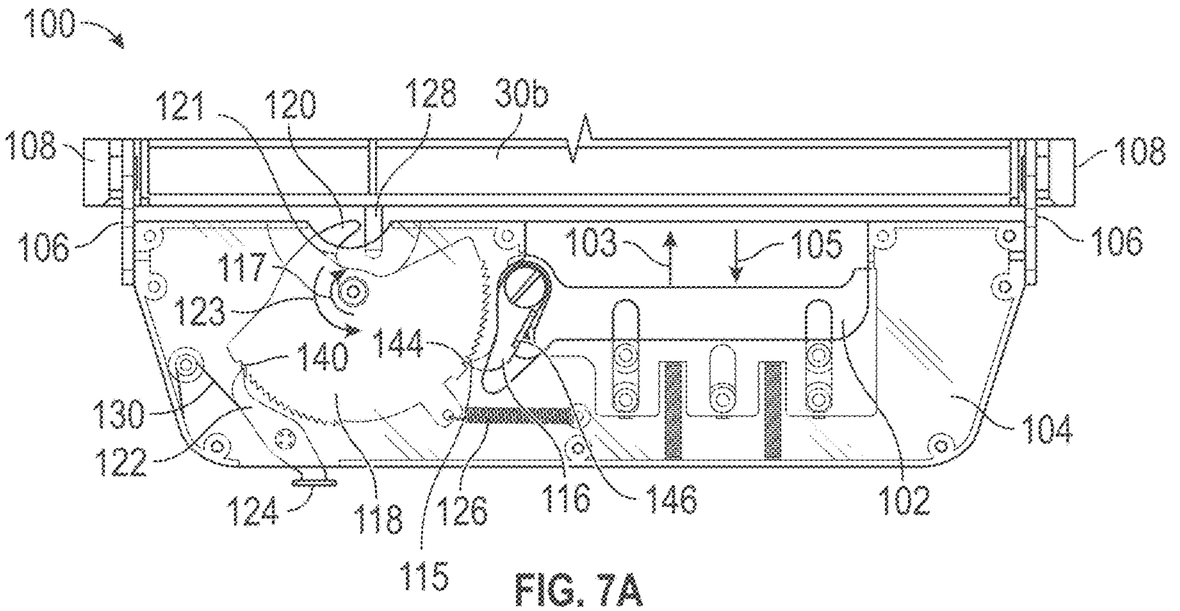
FIG. 7A is a partially-transparent top view of the embodiment of FIG. 6 in a first state.
Figure 7B:
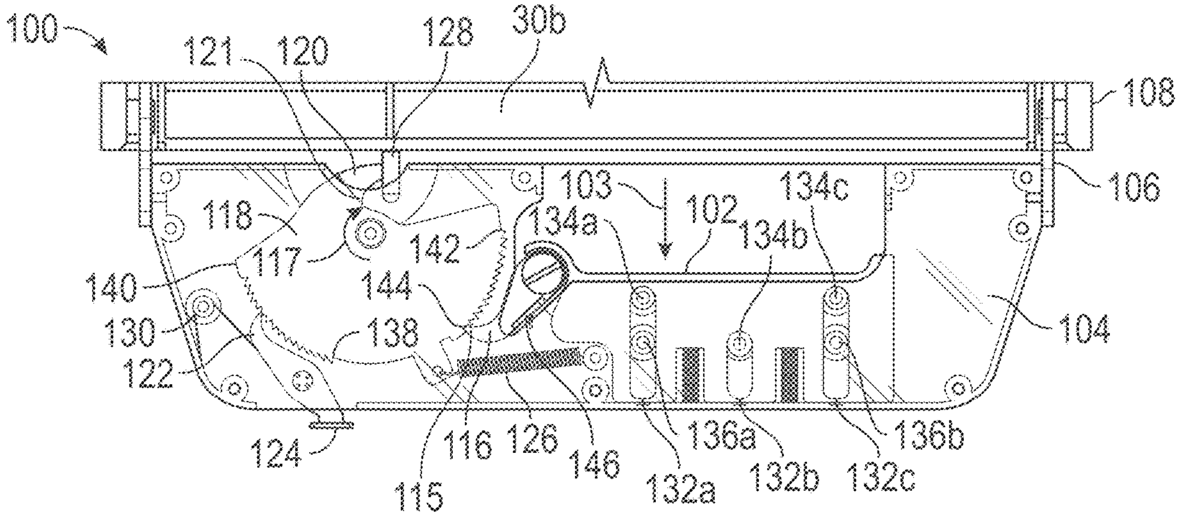
FIG. 7B is a partially-transparent top view of the embodiment of FIG. 6 in a second state.
Figure 7C:
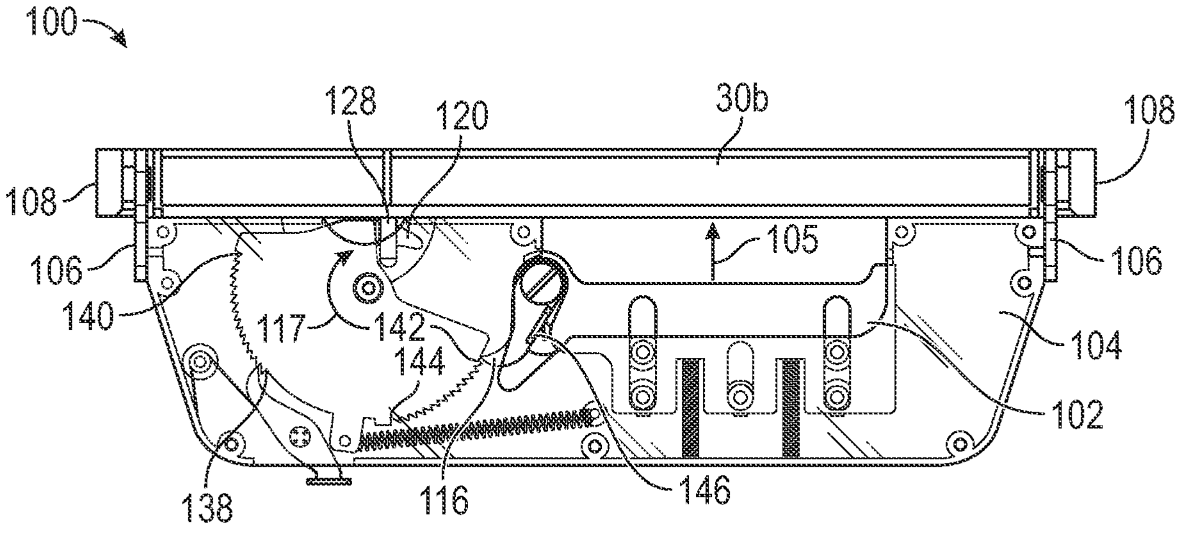
FIG. 7C is a partially-transparent top view of the embodiment of FIG. 6 in a third state.
Figure 7D:
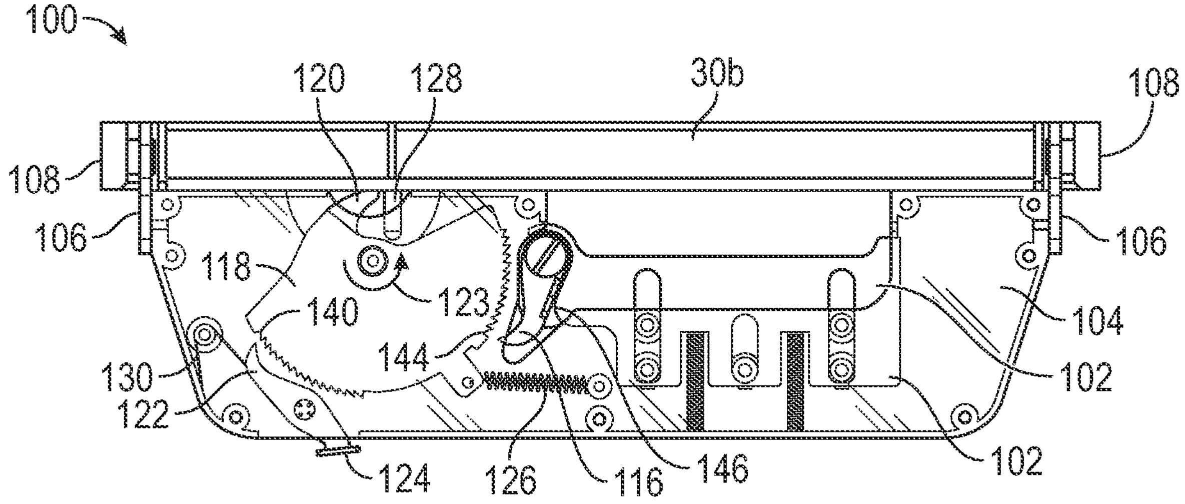
FIG. 7D is a partially-transparent top view of the embodiment of FIG. 6 in a fourth state.

FIG. 7A-FIG. 7D illustrate a progression of latch 100 from an unlatched state (FIG. 7A) to a latched state (FIG. 7C) and to a released state (FIG. 7D). In the unlatched state of FIG. 7A, the user has inserted tray 30 into chassis 10 and rotated handle 104 until handle 104 is almost fully pressed against switch tray 30. Thus, while cam hook 120 is unlatched, cam tooth 110 will, with handle 104 in this position, be almost fully engaging the striker within chassis 10 and, therefore, switch tray 30 is almost fully drawn into chassis 10 and connectors 42, 46 are almost fully seated. To close ratcheting latch 100, lever 102 is squeezed by a user in direction 103, which urges a tip 115 of driving pawl 116 against ratcheting gear 118. Pawl 116 engages a tooth between teeth 142 and 144 of gear 118 and rotates gear 118 in direction 117.

FIG. 7B illustrates an intermediate state between latched and unlatched. In FIG. 7B, lever 102 has been squeezed in direction 103 and rotation in direction 117 has caused cam hook 120 to engage a striker 128 on the face of switch tray 30. The motion of lever 102 is constrained to be linear by track followers 134, 136 travelling within associated tracks 132. FIG. 7B illustrates lever 102 bottomed out against handle 104. Thus, to cause further rotation, lever 102 must be release and allowed to move at the urging of springs in direction 105 so that driving pawl 116 may ride along gear 118 and move closer to tooth 142. A stepping pawl spring 130 urges stepping pawl 122 against gear 118, engaging one of teeth 138-140, which maintains gear 118 in the position of FIG. 7B as driving pawl 116 travels in direction 105 with lever 102. With repeated squeezing and release of lever 102, gear 118 will be advanced in direction 117, causing the cam section 121 of cam hook 120 to draw striker 128 into handle 104 and snug handle 104 against the face of switch tray 30 as shown in FIG. 7C.

FIG. 7C illustrates the fully latched state. In FIG. 7C, with further squeezing of lever 102, gear 118 has been rotated in direction 117 causing cam hook 120 to ride along striker 128, pulling striker 128 into handle 104 and eliminating the distance between handle 104 and switch tray 30 (note that in FIG. 7B there was a gap between handle 104 and switch tray 30). FIG. 7C illustrates that, with stepping pawl 122 holding gear 118 in place, lever 102 may travel in direction 105 without cam hook 120 disengaging from striker 128.

The movement of handle 104 toward and against tray 30, shown in the change from FIG. 7B to FIG. 7C, causes arm 106 to rotate and cam tooth 110 to fully engage the striker (not shown) of chassis 10. With the downward rotation completed, the cam of cam tooth 110 has drawn tray 30 completely into chassis 10, fully seating connectors 42 and 46.

FIG. 7D illustrates the unlatched state. In FIG. 7D, stepping pawl 122 has been disengaged from teeth 138-140 by the user pressing and holding release button 124. Simultaneously, the user has pressed and held tab 146 on pawl 116, causing pawl 116 to disengage from teeth 142-144. With both pawls 116 and 122 disengaged, a reset spring 126 forces the rotation of gear 118 in direction 123, causing hook 120 to disengage from striker 128.

With cam hook 120 disengaged, handle 104 may be rotated away from switch tray 30 by the user to disengage cam tooth 110 from the associated striker on chassis 10. With cam tooth 110 disengaged, switch tray 30 may be withdrawn from chassis 10.

Figure 8B:
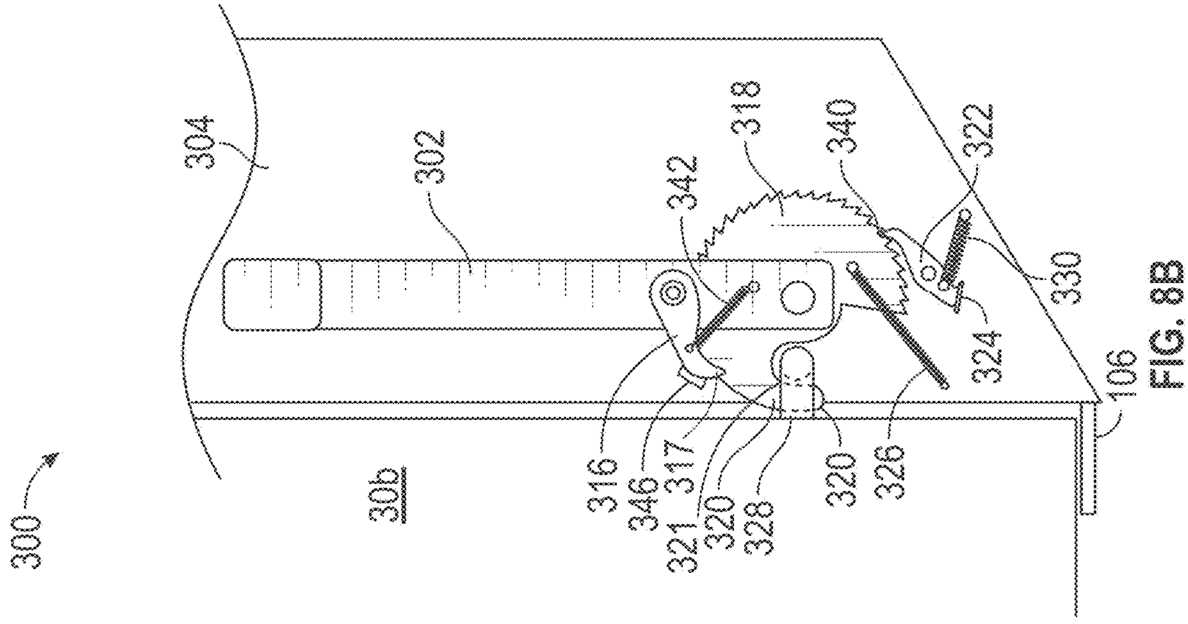
FIG. 8B is a partially-transparent top view of the embodiment of FIG. 8A in a second state.
Figure 8A:
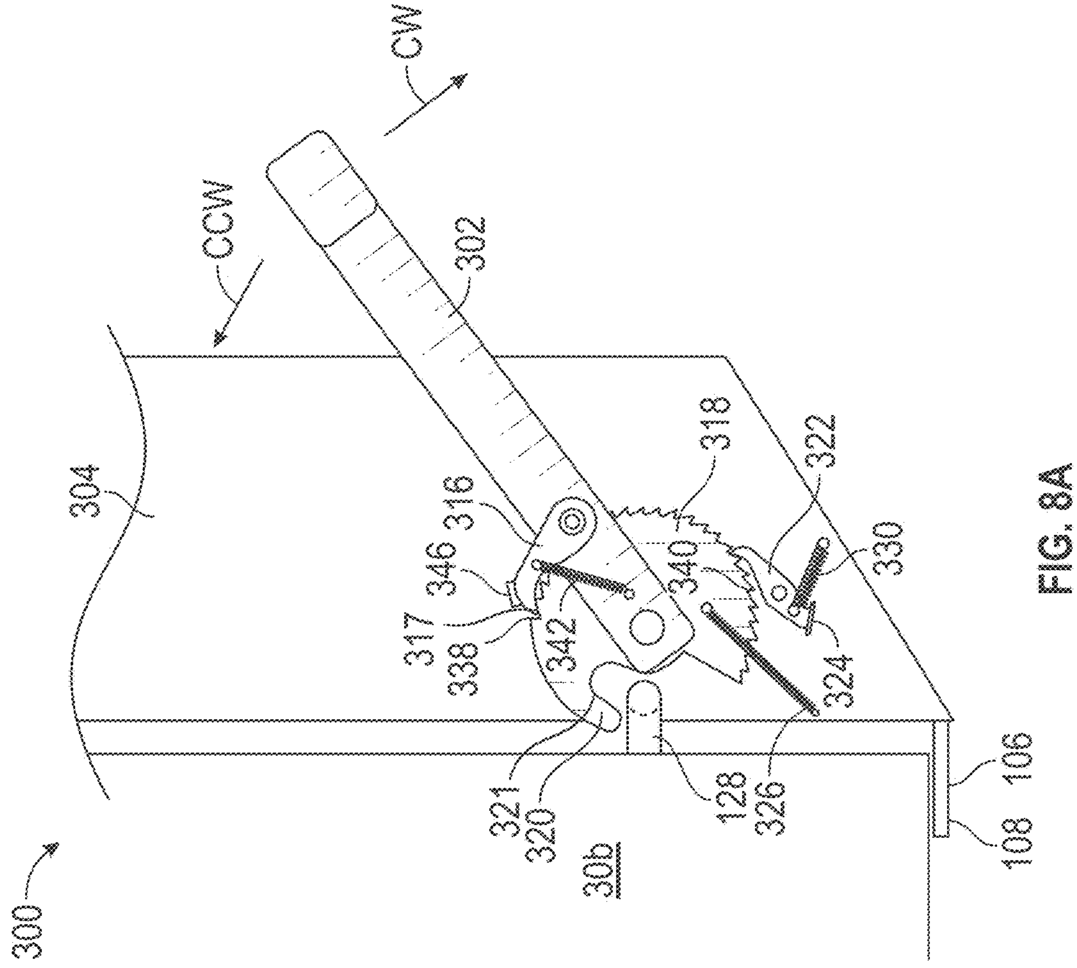
FIG. 8A is a partially-transparent top view of an embodiment of a ratcheting latch with a quick release mechanism in a first state.

FIG. 8A is a partially-transparent top view of an embodiment of a ratcheting latch 300 with a quick release mechanism in a first state. Ratcheting latch 300 functions largely as described with reference to latches 100 and 200. For example, the latching and unlatching of latch 300 has the same effect on arm 106 and cam teeth 110 as the latching and unlatching of latch 100. The following discussion of ratcheting latch 300 will focus on the differences. One of skill should understand the discussion of latch 100 to otherwise apply equally to latch 300.

In FIG. 8A, a handle 304 includes a lever f that may be moved counter-clockwise (CCW) by a user to ratchet a gear 318 CCW, which causes a cam tooth 320 to engage with striker 128 and pull striker 128 into handle 304. As with latch 100, this pulls switch tray 30 into chassis 10, seats connectors 42 and 46, and also locks latch 300 in place against the face of switch tray 30. When rotated CCW, lever 302 drives a tip 317 of a driving pawl 316 against ratcheting gear 318. Pawl 316 is biased by a spring 342 to engage a tooth between teeth 338 and 340 and rotates gear 318 CCW with the motion of lever 302. This rotation causes cam hook 320 to engage striker 128 on the face of switch tray 30. With further CCW movement of lever 302, and the resulting rotation of gear 318, the cam section 321 of cam hook 320 draws striker 128 into handle 304, snugging handle 304 against the face of switch tray 30.

A stepping pawl 322 is biased toward gear 318 by a spring 330 such that pawl 322 engages a tooth between teeth 338 and 340 of gear 318. As gear 318 is rotated CCW, pawl 322 rides along the teeth toward tooth 340. Teeth 338-340 are slanted so that they cooperate with pawls 316, 322 to resist CCW rotation of gear 318. Thus, as gear 318 rotates CCW, pawl 322 engages teeth 338-340 to hinder CW rotation of gear 318. As a result, with cam hook 320 fully engaging striker 128, stepping pawl 322 maintains that latched position by preventing gear 318 from CW rotation.

To unlatch ratcheting latch 300, stepping pawl 322 is disengaged from teeth 338-340 by the user pressing a release button 324. Simultaneously, the user presses a tab 346 on pawl 316 to cause pawl 316 to disengage from teeth 338-340. With both pawls 316 and 322 disengaged, a reset spring 326 is sized to exert a force sufficient to cause cam hook 320 to rotate CW and disengage from striker 128.

As with latch 100, with latch 300 and with cam hook 320 disengaged, handle 304 may be rotated forward by the user to disengage cam tooth 110 from the associated striker on chassis 10. With cam tooth 110 disengaged, switch tray 30 may be withdrawn from chassis 10.

Thus, the embodiment uses the force supplied by the user to lever 302 and leverages that force by the cam action of cam hook 320 and the associated cam action of cam tooth 110 to ensure an appropriate force is used to fully seat connectors 42 and 46. This satisfies the requirements in some data centers that connectors be seated without the use of tools. Furthermore, embodiments reduce user effort by employing cam hook 320 in combination with cam tooth 110 and are thus user friendly-only a single hand is required to both seat connectors 42 and 46 and latch handle 304 against switch tray 30. This is preferable to using thumbscrews. Even more, the quick release provided by release button 324 and tab 346 makes removal as user-friendly as installation. And in instances where space on the face of the device is at a premium, such as when the face is a passage for cooling airflow, the thin frontal profile of handle 104 is welcome since it does not obstruct the face.

FIG. 8B is a partially-transparent top view of the embodiment of FIG. 8A in a latched state. FIG. 8B illustrates that in snugging handle 304 against the face of switch tray 30, cam hook 320 caused handle 304 to move a distance 348 from an initial position 350, which represents the position of handle 304 in FIG. 8A.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:

a handle;

a rotatable plate connected to the handle and including a perimeter partially defined by a toothed arc with slanted teeth;

a first hook configured with a cam section and connected to the rotatable plate;

a lever; and a first pawl connected to the lever, the first pawl being biased by a first spring to engage with a respective one of the slanted teeth on the toothed arc, the first pawl being configured such that as the lever moves in a first direction and a first striker is positioned within the first hook, the first pawl sequentially engages with consecutive teeth of the slanted teeth and causes rotation of the rotatable plate in a first rotary direction and the cam section to move against the first striker and pull the first striker toward the handle, the first pawl being further configured to ride over consecutive teeth of the slanted teeth as the lever moves in a second direction.

2. The apparatus of claim 1, further comprising:

a second pawl biased by a second spring to engage with a respective one of the slanted teeth on the toothed arc, the second pawl being configured such that the second spring causes the second pawl to engage one of the slanted teeth and hinder rotation of the rotatable plate in a second rotary direction and to ride over consecutive teeth of the slanted teeth permit rotation of the rotatable plate in the first rotary direction.

3. The apparatus of claim 2, further comprising:

a third spring configured to rotate the rotatable plate in the second rotary direction;

a tab connected to the first pawl, movement of the tab away from the plate causing the first pawl to disengage from the slanted teeth on the toothed arc; and a button connected to the second pawl, movement of the button toward the rotatable plate causing the second pawl to disengage from the slanted teeth on the toothed arc, wherein:

when the tab is moved away from the plate and the button is moved toward the plate, the third spring causes the rotation of the rotatable plate in the second rotary direction, which causes the first hook to disengage the first striker.

4. The apparatus of claim 1, wherein:

the first direction is a linear direction, a base of the first pawl is pivotably connected to the lever, and movement of the lever in the first direction causes a tip of the pawl engaged with consecutive slanted teeth to follow the rotation of the rotatable plate in the first rotary direction.

5. The apparatus of claim 4, wherein the lever includes a track oriented in the first direction and the handle includes a track follower, the track and track follower constraining movement of the lever to an axis defined by the first direction.

6. The apparatus of claim 5, wherein the rotatable plate, the hook, and the lever are at least partially contained within the handle, and the lever, when moving in the first direction, is further received within the handle.

7. The apparatus of claim 1, further comprising:

an arm connected to the handle; and a cam tooth extending from the arm, wherein, when:

the first striker is connected to a face of a first chassis and the arm is pivotably connected to the first chassis such that the cam tooth moves in a plane perpendicular to the face, the first chassis is in slidable contact with a second chassis including a second striker, and the first striker is positioned within the first hook and the cam tooth is in contact with the second striker;

when the cam section moves against the first striker and pulls the first striker toward the handle, the arm is pulled toward the first chassis, causing the cam tooth to move against the second striker and move the first chassis a first distance with respect to the second chassis.

8. The apparatus of claim 7, wherein a limit of the first distance is based on a first connector associated with the first chassis mating with a second connector associated with the second chassis.

9. The apparatus of claim 7, further comprising:

a second pawl biased by a second spring to engage with a respective one of the slanted teeth on the toothed arc, the second pawl being configured such that the second spring causes the second pawl to engage one of the slanted teeth and hinder rotation of the rotatable plate in a second rotary direction and to ride over consecutive teeth of the slanted teeth permit rotation of the rotatable plate in the first rotary direction.

10. The apparatus of claim 9, further comprising:

a third spring configured to rotate the plate in the second rotary direction;

a tab connected to the first pawl, movement of the tab away from the rotatable plate causing the first pawl to disengage from the slanted teeth on the toothed arc; and a button connected to the second pawl, movement of the button toward the plate causing the second pawl to disengage from the slanted teeth on the toothed arc, wherein:

when the tab is moved away from the plate and the button is moved toward the rotatable plate, the third spring causes the rotation of the rotatable plate in the second rotary direction, which causes the first hook to disengage the first striker.

11. The apparatus of claim 9, wherein:

the first direction is a linear direction;

a base of the first pawl is pivotably connected to the lever; and movement of the lever in the first direction causes a tip of the pawl engaged with consecutive slanted teeth to follow the rotation of the rotatable plate in the first rotary direction.

12. The apparatus of claim 11, wherein the lever includes a track oriented in the first direction and the handle includes a track follower, the track and track follower constraining movement of the lever to an axis defined by the first direction.

13. The apparatus of claim 12, wherein the rotatable plate, the hook, and the lever are at least partially contained within the handle, and the lever, when moving in the first direction, is further received within the handle.

14. The apparatus of claim 7, further comprising:

a second pawl biased by a second spring to engage with a respective one of the slanted teeth on the toothed arc, the second pawl being configured such that the second spring causes the second pawl to engage one of the slanted teeth and hinder rotation of the rotatable plate in a second rotary direction and to ride over consecutive teeth of the slanted teeth permit rotation of the rotatable plate in the first rotary direction.

15. A method comprising:

positioning a handle adjacent to a face of a chassis having a striker, the handle including:

a lever, a rotatable plate connected to the lever and having a perimeter partially defined by a toothed arc with slanted teeth and a cam hook with a cam section, and a first pawl connected to the lever and biased by a first spring to engage the toothed arc, the first pawl being configured such that as the lever moves in a first direction, the first pawl sequentially engages with consecutive teeth of the slanted teeth and causes rotation of the rotatable plate in a first rotary direction, the first pawl being further configured to ride over the slanted teeth as the lever moves in a second direction; and actuating movement of the lever in the first direction to rotate the rotatable plate in the first rotary direction and cause the cam section to move against the striker and pull the striker toward the handle.

16. The method of claim 15, wherein the cam tooth moves in a plane perpendicular to the face.

17. The method of claim 15, further comprising:

hindering rotation of the rotatable plate in a second rotary direction opposite the first rotary direction by using a second pawl biased by a second spring to engage with a respective one of the slanted teeth on the toothed arc, the second pawl being configured such that the second spring causes the second pawl to engage one of the slanted teeth and hinder rotation of the rotatable plate in a second rotary direction and to ride over consecutive teeth of the slanted teeth permit rotation of the rotatable plate in the first rotary direction.

18. The method of claim 17, further comprising:

disengaging the hook from the striker by pressing a tab connected to the first pawl causing the first pawl to disengage from the slanted teeth on the toothed arc and pressing a button connected to the second pawl to cause the second pawl to disengage from the slanted teeth on the toothed arc such that a third spring rotates the rotatable plate in the second rotary direction and disengages the hook from the striker.

19. The method of claim 15, wherein a base of the first pawl is pivotably connected to the lever and movement of the lever in the first direction causes a tip of the pawl engaged with consecutive slanted teeth to follow the rotation of the rotatable plate in the first rotary direction.

* * * * *